(12) United States Patent
Hurst et al.

(10) Patent No.: US 9,552,407 B1
(45) Date of Patent: Jan. 24, 2017

(54) LOG-BASED SYNCHRONIZATION WITH CONDITIONAL APPEND

(71) Applicant: Amazon Technologies, Inc., Reno, NV (US)

(72) Inventors: William Nathan John Hurst, Seattle, WA (US); Ivan Avramov, Sammamish, WA (US); Jonathan Peter Wright, Seattle, WA (US); Timothy Daniel Cole, Seattle, WA (US); Christopher Gerald Emery, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 14/024,473

(22) Filed: Sep. 11, 2013

(51) Int. Cl.
*G06F 17/30* (2006.01)
*G06F 7/00* (2006.01)

(52) U.S. Cl.
CPC .............................. *G06F 17/30581* (2013.01)

(58) Field of Classification Search
USPC ....................................................... 707/625
See application file for complete search history.

(56) References Cited

U.S. PATENT DOCUMENTS

| 5,870,765 | A | 2/1999 | Bauer et al. |
| 8,290,908 | B2 * | 10/2012 | McCarthy et al. ........... 707/635 |
| 8,880,735 | B2 * | 11/2014 | Tosey ............................. 709/248 |
| 2006/0155945 | A1 | 7/2006 | McGarvey |
| 2009/0271696 | A1 | 10/2009 | Bailor et al. |
| 2011/0307798 | A1 | 12/2011 | Lezama et al. |
| 2012/0179877 | A1 | 7/2012 | Shriraman et al. |

OTHER PUBLICATIONS

Randy Urbano et al.: "Oracle® Streams Replication Administrator's Guide", 11g Release 2 (11.2) E10705-09, Aug. 2011, ORACLE®.*

* cited by examiner

*Primary Examiner* — Kuen Lu
(74) *Attorney, Agent, or Firm* — Baker & Hostetler LLP

(57) ABSTRACT

A device may participate in a shared data state in which editing operations performed locally are distributed and synchronized with other devices participating in the shared data state. Data may be maintained in log-structured storage files on each device. Changes made locally may be represented by change descriptors conditionally appended to the end of a log. The size of the log may be monotonically increasing. Monotonically increasing identifiers may be used to implicitly or explicitly identify change descriptors. Upon conflict resolution, conditionally appended change descriptors may be committed. Non-committed change descriptors may be conditionally reappended to the end of the log for further conflict resolution.

19 Claims, 15 Drawing Sheets

LOG-BASED SYNCHRONIZATION WITH CONDITIONAL APPEND

BACKGROUND

In networked computing environments, one or more users may wish to view and edit data using multiple computing devices. A user may have access to a personal computer, a web server and a mobile device, and may wish to view and manipulate the same set of data from each device. One such scenario involves taking photographs using a mobile device, performing image editing on a personal computer and allowing other users to comment on the photographs via a web site.

In these scenarios, the shared data may be kept locally on each device and periodically synchronized. However, changes made on one device or by one user may conflict with those made by another device or user. In addition, devices may occasionally lose access to the network or go offline for periods of time. Accordingly, methods for synchronizing shared data may be complex and prone to errors or inconsistent behavior.

BRIEF DESCRIPTION OF DRAWINGS

The drawings provided herein are designed to illustrate example embodiments and are not intended to limit the scope of the disclosure.

DETAILED DESCRIPTION

A user may have access to multiple computing devices, such as personal computers, mobile phones, cloud-based storage systems, web services and so forth. Such cases may involve a shared data state which is shared across two or more of the devices. For example, the user may desire to maintain a collection of photographs organized into albums and tagged with various forms of metadata, such as the location and subjects of the photographs. The user might take photographs using a smartphone, organize the photographs using a personal computer and share the photographs with others. Ideally, data added and changes made on one device could be seamlessly integrated into the shared data state and be accessible on any of the user's devices. The data and changes might be uploaded immediately or at some later time. At various times, a user might gain or lose network connectivity. Changes made to the data while disconnected could be propagated to other devices and reconciled once network connectivity is restored.

In other cases a number of users may desire to collaboratively edit a shared data state. For example, each user might take photographs on his or her smartphone that are published to a photo albums shared by all of the users. Each user might upload various types of metadata about the photos, for example by adding comments to photographs taken by other users. Users might also edit the photographs or organize the photographs by placing them into different folders or albums. In some cases, the editing might occur in real time so that each user might see the other's changes as they are being made. In other cases, a user might edit the photographs while not connected to a network or while other users are unavailable. At some later time, when the user is again connected to a network, the changes might be propagated from that user's device to those of others who share access to the shared data state.

In the above cases there is a possibility that changes made to the shared data state conflict with one another. For example, an individual user working on separate devices might edit the same photo twice, or the same photograph might be placed in separate albums by different users. Various approaches may be employed to resolve conflicting changes. One example of a conflict-resolution mechanism involves file synchronization. The modification dates of files on each computing device may be compared to corresponding files on other devices, and replaced if they are out of date. Various techniques may be employed to optimize the amount of data that needed to be evaluated, such as examining only those files whose modification dates are later than the last time synchronization was performed. However, this approach may be relatively inefficient because it involves exchanging files, a quantum of data that is relatively large.

Figure 1:
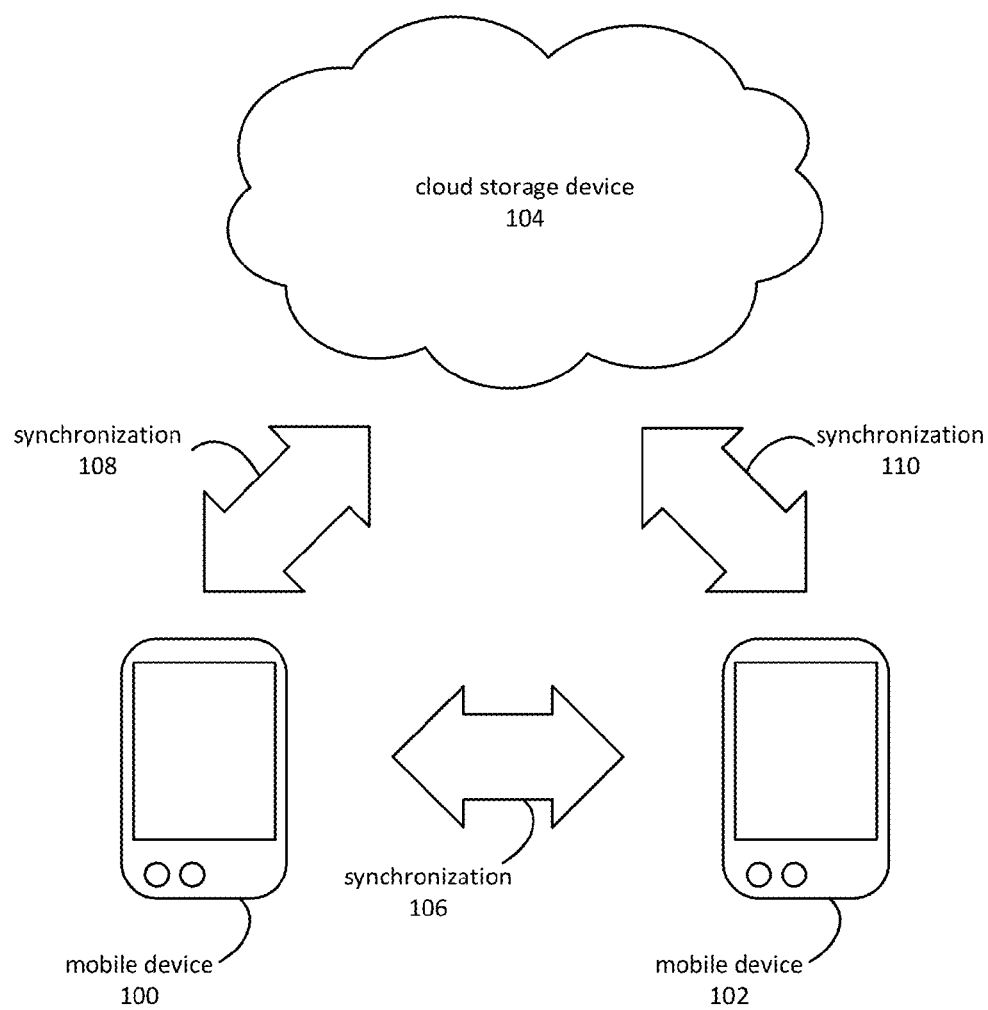
FIG. 1 is a block diagram depicting synchronization between various devices including mobile devices and a cloud storage device.

An alternative approach, employed by various embodiments disclosed herein, involves the use of log-structured storage on at least some of the synchronizing devices. Log-structured storage may involve maintaining collections of change descriptors that collectively define a version of a data state shared among the various synchronizing devices. FIG. 1 depicts an illustrative embodiment of this type of system. Various computing devices, such as mobile device 100, mobile device 102 and cloud storage device 104 may share a data model to be synchronized at each location. The terms computing device, computing node, computer or device may refer to systems maintaining a collection of data corresponding to the shared data state. Accordingly, as described herein, devices such as smartphones, mobile phones, personal computers, laptops, cloud-based storage, web servers, web services and so forth may all be considered to be computing devices.

Various operations may be performed on a data model shared between mobile device 100, mobile device 102 and cloud storage device 104. These operations may be described in general terms as editing the shared data state, and may involve inserting new data, editing data or deleting data. Editing operations may be described at various levels of granularity. For example, the addition of a new text file might be described as a single operation that corresponds to creating the file and inserting all of its contents. Another option is to describe the addition of the text file as a series of micro-transactions, including creating an empty file, inserting a first character, inserting a second character and so on.

The term change descriptor may be employed to refer to these descriptions, regardless of the level of granularity employed. Each device, such as mobile devices 100 and 102 and cloud storage device 104, may maintain a collection of change descriptors. Embodiments may maintain the collection of change descriptors as a complement to traditional file-based mechanisms, or in place of a file-based mechanism. In the latter case, a materialized view of the shared data state, or of individual objects or elements within the shared data state, may be constructed by traversing change descriptors in a collection of change descriptors and applying the changes sequentially in the order they were entered.

Users of each device may independently perform various editing operations on the shared data state. For example, a user of mobile device 100 might make a voice recording and add the corresponding file to a folder that is an element of the data model shared by all three devices 100, 102 and 104. Prior to synchronization, an editing operation may be stored on device 100 as a sequence of change descriptors. The collection of change descriptors on device 100 can be said to represent at least a subset of the shared data state. At a given time, each device 100, 102 or 104 might have access to a different subset of the shared data state, reflective of editing operations performed subsequent to the last full synchronization between all three devices 100, 102 and 104.

Synchronization may comprise transmitting sets of change descriptors between each of devices 100, 102 and 104. Various paths may be taken to synchronize the devices. For example, synchronization 106 may be performed between mobile device 100 and mobile device 102, synchronization 108 between mobile device 100 and cloud storage device 104, and synchronization 110 between mobile device 102 and cloud storage device 104. Another possibility involves synchronizing between each device and a central server. For example, in FIG. 1 synchronization 108 might first occur between mobile device 100 and cloud storage device 104, followed by synchronization 110 between mobile device 102 and cloud storage device 104. This pattern may be repeated until all devices have been synchronized.

Embodiments may utilize various mechanisms to minimize the amount of data transferred between devices. When devices are fully synchronized with respect to each other, their collections of change descriptors may be equivalent, perhaps containing identical sets of change descriptors or some logical equivalent thereof. However, if a particular device has been used to edit the shared data state, that device will have additional change descriptors that may be distributed among the other devices during synchronization. For efficiency, the additional change descriptors or their equivalents may be distributed to the other machines without also distributing redundant data such as change descriptors already held by the other devices.

Embodiments may employ values, which may be referred to as "hither" values, to determine which sets of change descriptors are to be distributed during synchronization. A hither value may be described as a monotonically increasing ordinal position within a change log. A hither value may be used for at least two purposes. First, a hither value may indicate the ordinal position of the end of the log, which is also indicative of where the next change descriptor will be entered. This type of hither value may be referred to as a "local hither." Second, a hither value may be used to represent an ordinal position within a change log that is representative of which change descriptors have already been processed by most or all of the devices participating in the shared data state. This type of hither value may be referred to as a "consensus hither" because it represents a consensus view of which change descriptors are known to have been processed by each device.

Figure 2A:
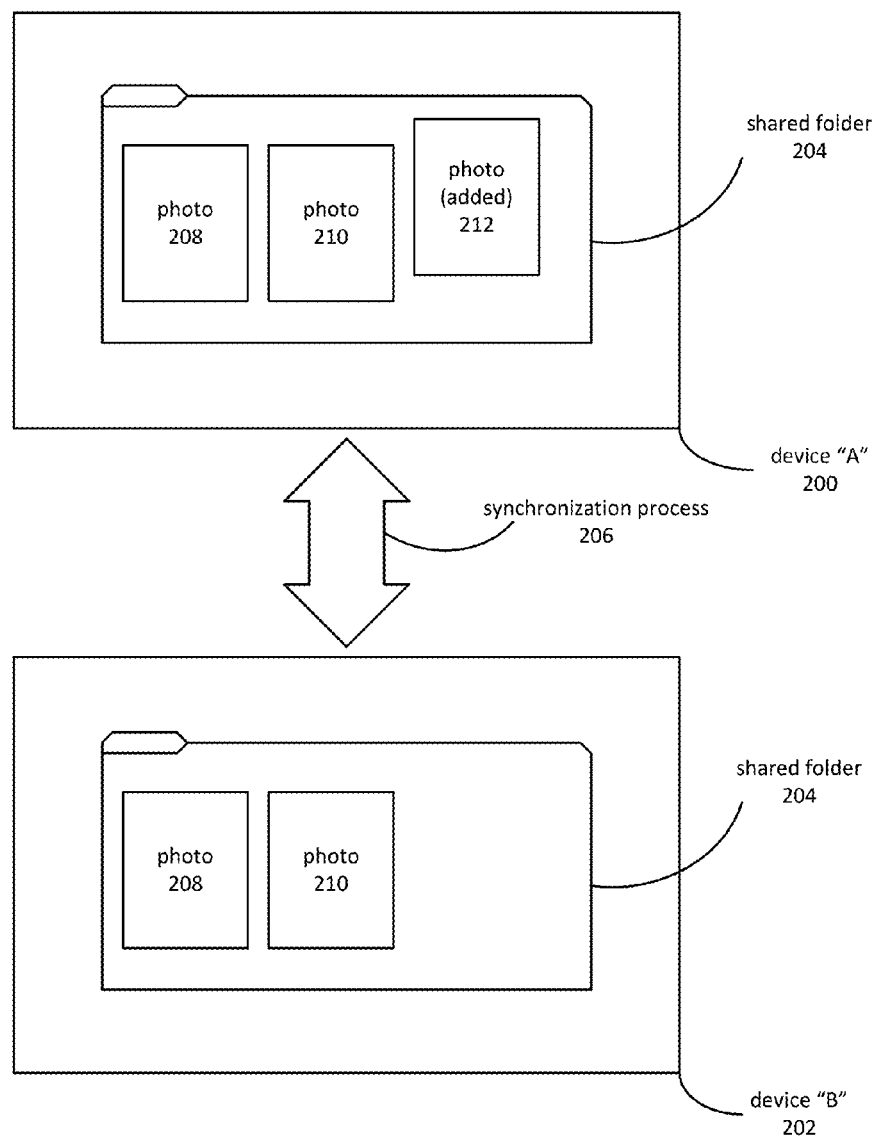
FIG. 2A is a block diagram depicting an example of editing and synchronizing photographs maintained in a shared data state.

FIG. 2A depicts an illustrative example of editing and synchronizing elements of a shared data state. For purposes of the illustration, device "A" 200 and device "B" 202 may participate in a shared data state comprising shared folder 204, which may be represented, due to previous activities of synchronization process 206, in a collection of change descriptors on each of device "A" 200 and device "B" 202. In addition, shared folder 204 might contain photo 208 and photo 210, which may also be represented in a collection of change descriptors on each of device "A" 200 and device "B" 202. Shared folder 204 might then be edited by the addition of photo 212. Initially, change descriptors representative of photo 212 may be present only on device "A" 200, where the editing operation may be presumed, for illustrative purposes, to have occurred. At some later time, synchronization process 206 may be performed to distributed change descriptors representative of photo 212 to device "B" 202.

Figure 2B:
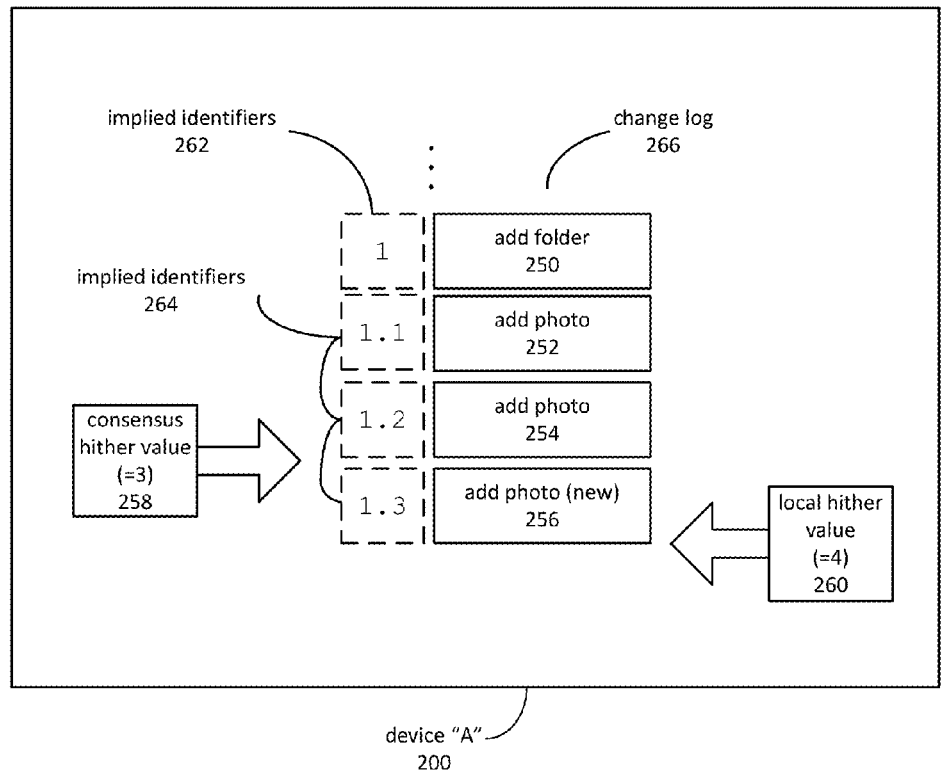
FIG. 2B is a block diagram depicting an embodiment of a change log containing local changes to a shared data state.

FIG. 2B depicts an illustrative example of change descriptors on device "A" 200 after a photo 212 has been added but prior to a subsequent invocation of synchronization process 206. A collection of change descriptors, depicted as change log 266, may include change descriptors such as add folder 250 and add photo 252, 254 and 256. The last change descriptor, add photo 256, may correspond to photo 212 in FIG. 2A.

An individual change descriptor, such as add photo 252, may contain sufficient information to completely represent the change it is associated with. For example, a change descriptor for adding a binary file, such as a photo, might include a binary representation of the file. In some cases for some embodiments, a sequence of steps might be performed when adding a photo, such as recording the initial snapshot, adjusting the brightness, removing red eye and so forth. If so, a sequence of change descriptors representing this sequence of actions might be recorded, rather than only an add photo operation.

Consensus hither value 258 may comprise a value indicative of change descriptors that are known, by both device "A" 200 and device "B" 202, to have been processed by both devices. Local hither value 260 may represent change descriptors processed locally on device "A" 200. Change descriptors between the two values may be distributed during synchronization. The consensus hither value might then be updated to reflect all devices having processed add photo 256.

The operations reflected by the change descriptors 250, 252, 254 and 256 in change log 266 may be associated with implied identifiers 262 and 264, which may be based on the ordering of change descriptors in the change log. More generally, implied identifiers such as 262 and 264 may be based on the position of an event or change in a causal tree. A hither value may be described as reflective of an implied ordering across all operation types, or as being relative to the root of a causal tree. Other examples are implied identifier 262 based on the order of folder additions, and implied identifier 264 based on the order of adding photos to a folder, relative to the folder addition referred to by change descriptor 250. Implied orderings for a given operation type might be global to all of change log 266, and can also be relative to a previous operation. For example, in FIG. 2B, add photo 256 might have an implied identifier of "1.3" relative to add folder 250 having an implied identifier of "1."

The ordering of elements within change log 266, or more generally the positioning of the elements within a causal tree, may allow various inferences concerning the scope and target of various operations. For example, add photo change descriptors 252, 254 and 256 may be presumed to target the folder referred to in the preceding add folder change descriptor 250. More generally, linear prediction may be employed to infer context information for change descriptors based on some or all prior change descriptors. This approach allows for change descriptors to be represented with relative compactness because it may reduce the amount of redundant information included in a sequence of change descriptors. For example, the add photo change descriptors 252, 254 and 256 would not need to duplicate target folder information held in add folder change descriptor 250. In addition to inferring context from change descriptors, various annotations may also be associated with regions of change descriptors within change log 266, from which additional context information may be inferred.

Figure 3A:
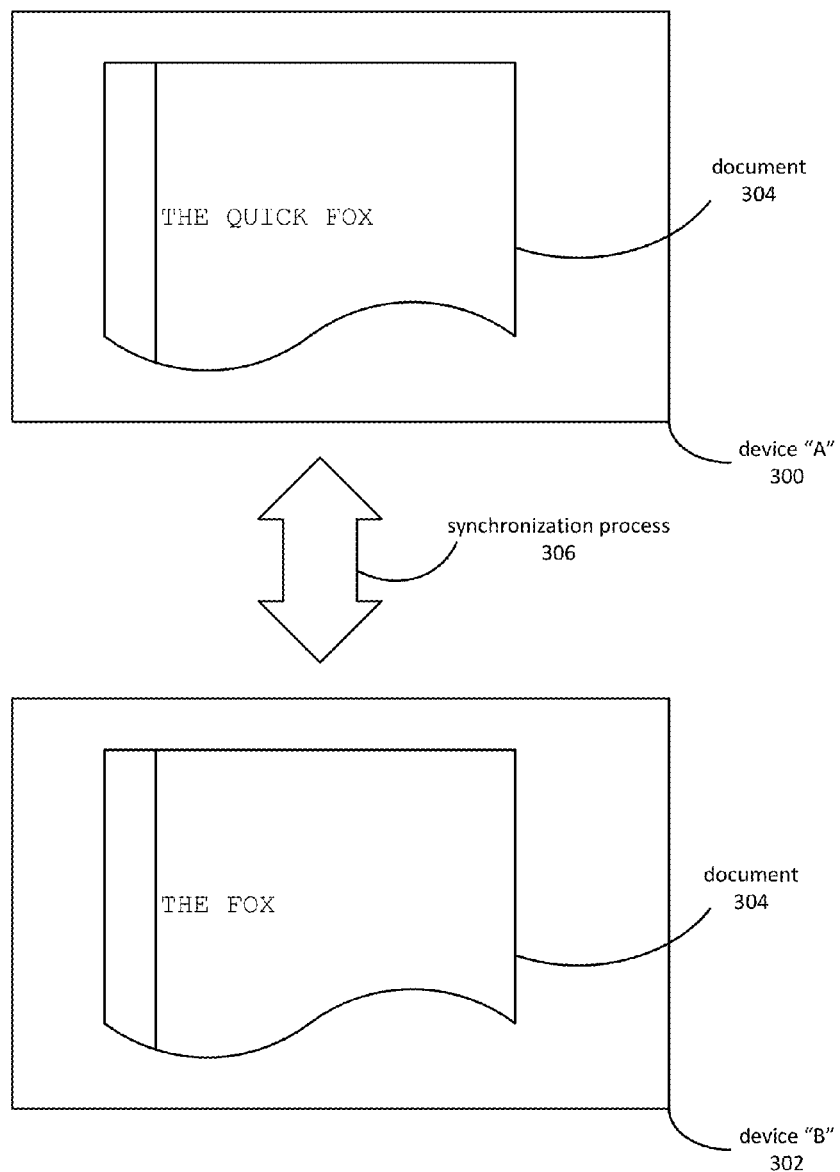
FIG. 3A is a block diagram depicting incremental changes to a shared data state.
Figure 3B:
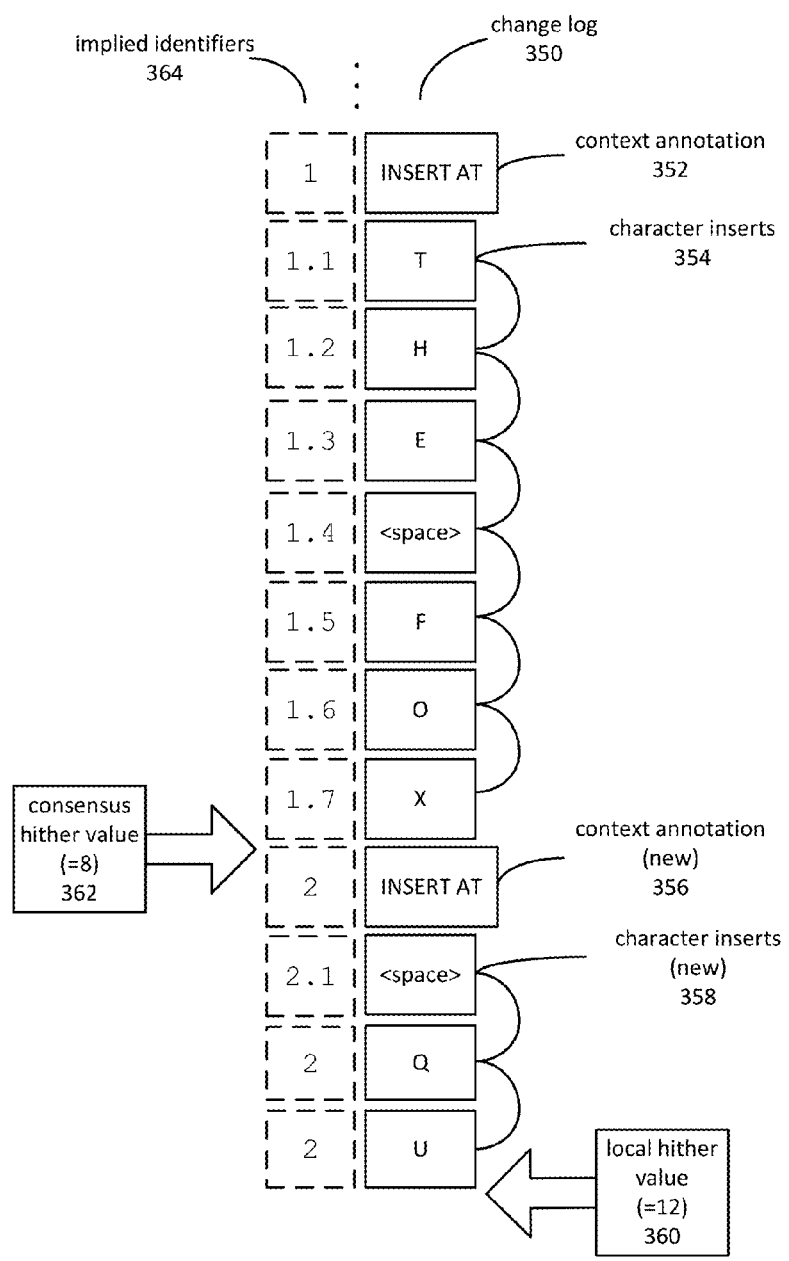
FIG. 3B is a block diagram depicting an embodiment of a change log containing locally made incremental changes to a shared data state.

Change descriptors may be used to describe small, incremental changes to a shared data state. FIG. 3A is an illustrative example depicting editing and synchronization of a shared data state comprising document 304. Device "A" 300 and device "B" 302 each maintain a collection of change descriptions in an event log, collectively defining the shared data state. For illustrative purposes, document 304 may be presumed to contain the text "THE FOX." The contents of the document have been distributed to device "A" 300 and device "B" 302 as a sequence of change descriptors and annotations, such as those depicted in FIG. 3B as context annotation 352 and character inserts 354. Context annotation 352 may provide information concerning the location of subsequent character inserts 354. Consensus hither value 362 may indicate that these change descriptors have been processed by both device "A" 300 and device "B" 302, which may occur during synchronization process 306.

An editing operation may be performed on a data model shared between device "A" 300 and device "B" 302. For example, a user of device "A" 300 might begin to insert the word "QUICK" into the text of document 304. As the characters are entered on device "A" 300, change log 350 may be appended to contain new context annotation 356 and new character inserts 358. Context annotation 356 may indicate a position within document 304 at which subsequent character inserts 358 should be applied. Local hither value 360 may be updated to reflect change descriptors that have been processed locally but not yet propagated to other devices participating in the shared data state. Implied identifiers 364, based on positions of elements in the change log, or more generally within a causal tree, may be used to reference targeted elements of the shared data state. For example, if an editing operation were to be performed to replace "FOX" with "CAT," it could be preceded by a reference to the fifth ordinal position of the first insert at. Some embodiments might employ a reference to an absolute position in a change log, or an absolute position relative to the start of a set of changes.

A causal tree may be inferred from the position of elements within a change log and the respective targets of those elements. For example, in FIG. 3B context annotations 352 and 354 specify a location within a document to be edited. The document may be considered to be a root of a causal tree, and each context annotation 352 and 354 might be branches. The document itself might also be represented as a context annotation for a sequence of change descriptors. The leaves of the tree might comprise character inserts 354 and 356. Representing or analyzing the change log as a causal tree may be used by embodiments to detect the existence of potential conflicts, which may be present were elements of the causal tree overlap and absent were they do not.

Figure 4:
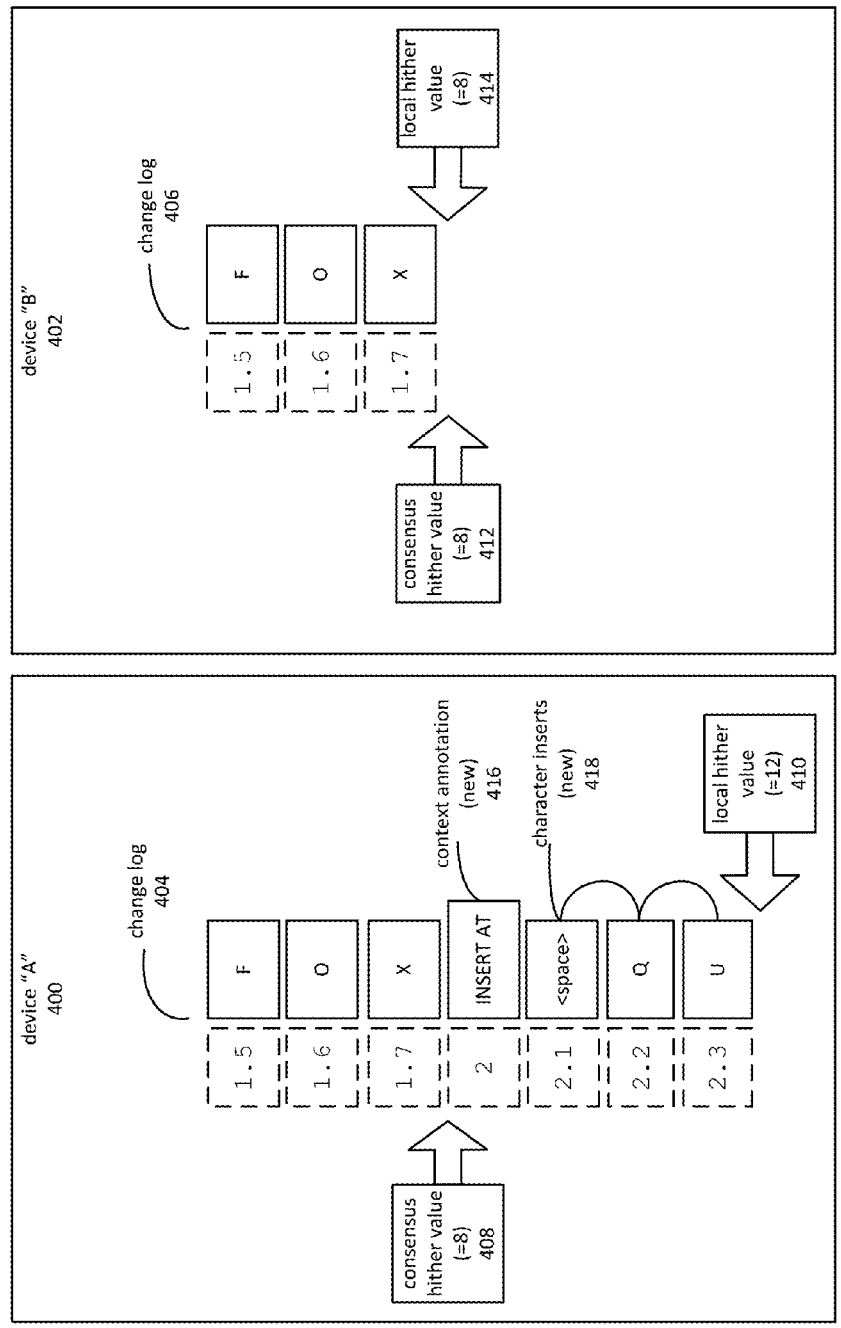
FIG. 4 is a block diagram depicting the use of local hither values and consensus hither values to determine a set of change descriptors to ship to other devices participating in a shared data state.

FIG. 4 depicts an illustrative example of using hither values to determine which change descriptors to distribute to other devices. Similar to the example of FIGS. 3A and 3B, device "A" 400 may have changes indicative of inserting text into a document that is an element of a shared data state. The changes may be represented by context annotation 416 and character inserts 418. A consensus hither value 408 may be equal to the ordinal number eight, indicating that both device "A" 400 and device "B" 402 are known to have processed at least the first eight change descriptors. Accordingly, change log 404 and change log 406 are known by both device "A" 400 and device "B" 402 to be equivalent at least through the first eight entries in each log.

In FIG. 4, the local hither value 410 for change log 404 is depicted as having a value of 12. This value may be compared to consensus hither value 408, which has a value of eight, to determine that the last four change descriptors in change log 404 have not been processed by device "B" 402, or in the general case by at least one other device participating in a corresponding shared data state. A synchronization process operating on device "A" may transmit change descriptors following the consensus hither value 408 to other devices participating in the shared data state, such as device "B" 402. Device "B" 402 may maintain its own copy of the consensus hither value 412, based on its knowledge of the last-most ordinal position of a change descriptor contained in a change log at both devices. In the case of FIG. 4, these change descriptors would be context annotation 416 and character inserts 418. Upon receiving these change descriptors, a process operating on device "B" 402 may append these change descriptors to the end of change log 406. Once these have been added, local hither value 414 for change log 406 may be updated to reflect the appended entries. A confirmation process may then notify device "A" 400 that change log entries up to 12 have been processed by device "B" 402. In the general case, a confirmation process may notify all devices participating in the shared data state that their copies of the consensus hither value, such as consensus hither value 408 for change log 404, should be updated.

Figure 5A:
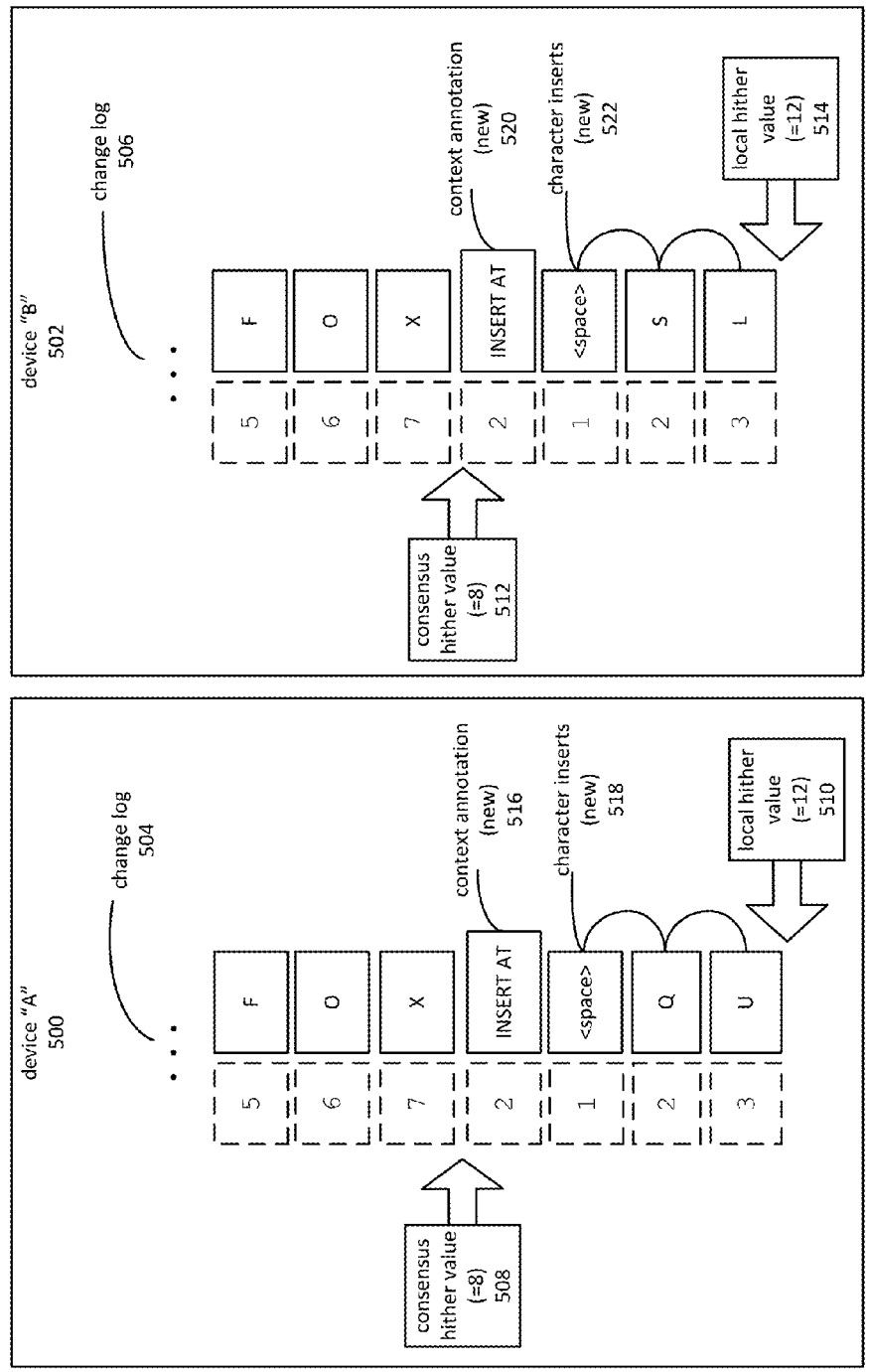
FIG. 5A is a block diagram depicting conflicting changes to a shared data state as represented by change logs.

FIG. 5A depicts a scenario similar to that of FIG. 4, except that in addition to the editing operation performed on device "A" 500, a second editing operation has been performed on device "B" 502. For illustrative purposes, assume that while a user of device "A" 500 was editing the document to say "THE QUICK FOX," a user of device "B" 502 was editing the same document to say "THE SLOW FOX." Accordingly, in this scenario the two editing operations are in conflict.

The existence of a conflict may be detected through various mechanisms and combinations thereof. One approach to detecting conflicts involves comparison of hither values. Change descriptors associated with hither values beyond the consensus hither value may be determined to be at least potentially in conflict. In FIG. 5A, consensus hither values 508 and 512 are the same, indicating that the devices were initially synchronized with respect to each other. If one of the devices had a lesser consensus hither value, it would indicate that other devices had participated in synchronization without the involvement of that device. The missing change descriptors might then be sent to that device. Local hither values 510 and 514 may be compared to consensus hither values 508 and 512, respectively, to determine the extent of changes that are yet to be synchronized. Embodiments may perform automatic or manual conflict resolution procedures between any two sets of change descriptors associated with post-consensus hither values.

Another approach, which some embodiments may employ subsequent to utilizing hither values as a threshold conflict detection mechanism, is to determine which elements of a shared data state are affected by potentially conflicting sets of change descriptors. In FIG. 5A, the targeted elements of two sets of change descriptors may be determined by examining context annotation 516 in change log 504 and context annotation 520 in change log 506. As a result of examining the context of the operations, it may be determined that, as is the case in the example depicted in FIG. 5A, the two sets of operations conflict because prior contextual information in the sequence of change descriptors indicates that they are directed to the same document. In some cases and embodiments, context annotation 516 and context annotation 520 might refer to non-overlapping regions within a document and could both be accepted as non-conflicting.

Figure 5B:
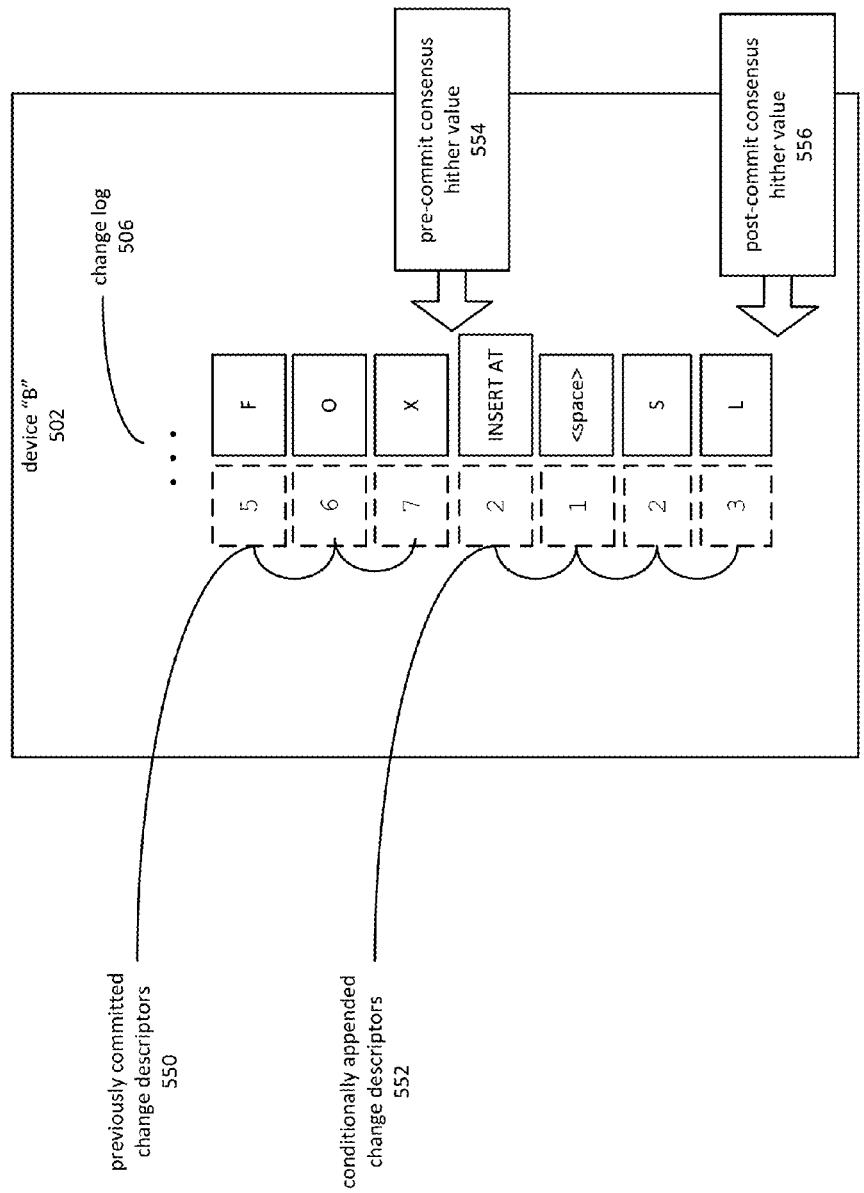
FIG. 5B is a block diagram depicting change descriptors committed and conditionally appended to a change log.

Change descriptors may be conditionally appended to a change log pending synchronization and resolution of any conflicts. FIG. 5B is an illustrative embodiment showing that an editing operation performed using device "B" 502, also depicted in FIG. 5A, may be recorded as a conditionally appended sequence of context annotations and change descriptors. After the editing operation has been performed, change log 506 has previously committed change descriptors 550 and conditionally appended change descriptors 552. As changes occur on a local device, corresponding change descriptors may be conditionally appended to a change log associated with the local device. Upon synchronization, conditionally appended change descriptors and any associated context annotations may be committed permanently to the change log, not only with respect to device "B" 502 but with respect to other devices participating in a shared data state. The committed entries may not necessarily be written immediately to other devices, but may nevertheless be treated as committed. When entries are committed, the consensus hither value on devices sharing the shared data state may be updated from pre-commit consensus hither value 554 to post-commit consensus hither value 556.

Figure 6:
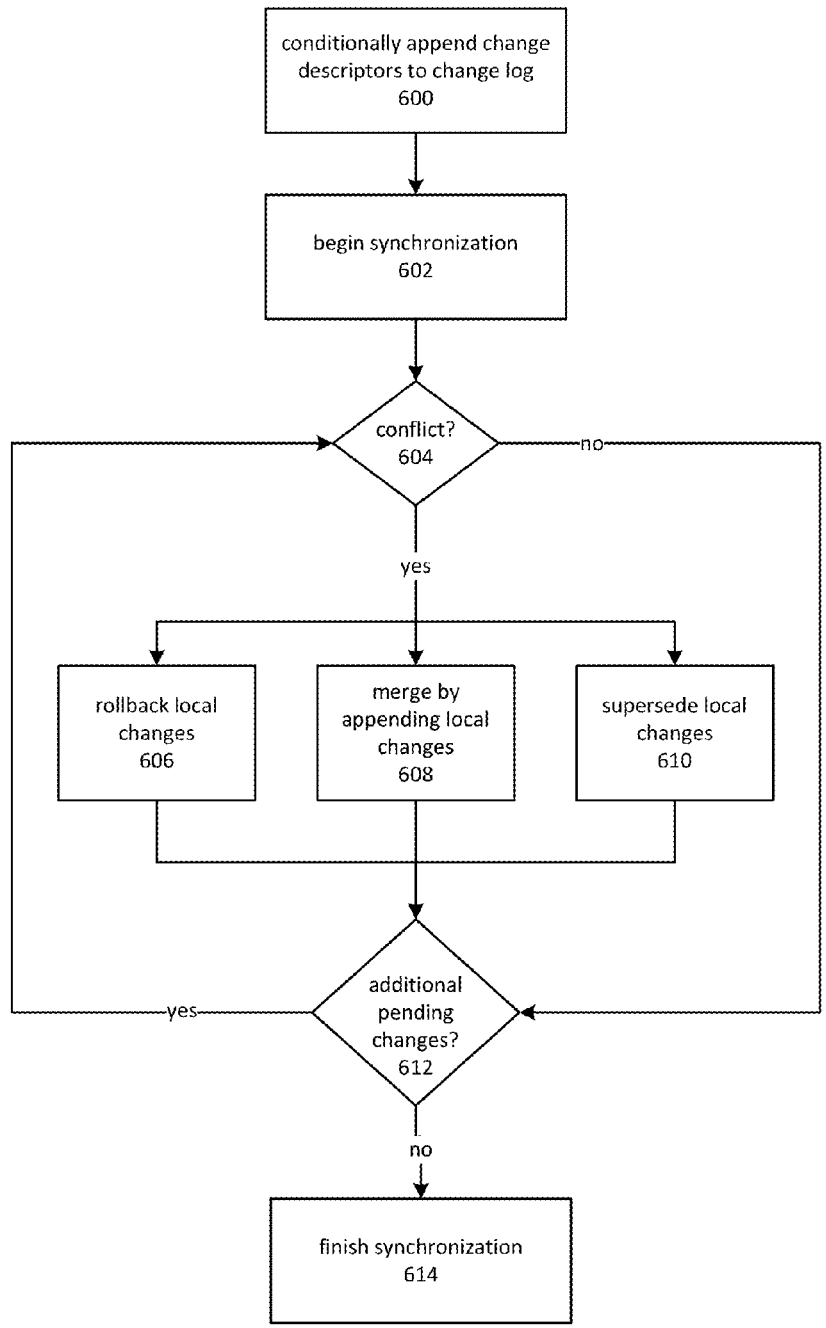
FIG. 6 is a flowchart depicting an embodiment for conditionally appending change descriptors to a change log and committing, rolling back, merging or overriding conditionally appended change descriptors.

An embodiment of conditionally appending change log entries is depicted by FIG. 6. Although depicted as a sequence of operations for illustrative purposes, those of ordinary skill in the art will appreciate that at least some of the depicted operations may be altered, omitted, reordered or performed in parallel.

At operation 600, one or more change descriptors may be conditionally appended to a change log on a computing device. The change log may function on the device as a log-structured storage mechanism in place of or as an adjunct to conventional file-based storage.

At operation 602, the computing device may begin to synchronize with one or more additional computing devices participating in a shared data state. The additional computing devices may maintain separate change logs. As described herein, the synchronization process may involve using local and consensus hither values to determine sets of conditionally appended change descriptors that may be distributed among the devices, or to a central server, for detection and resolution of conflicts.

Operation 604 depicts determining whether or not there are conflicts that require resolution. Sets of change descriptors, each set conditionally appended to a change log, may be examined to determine if they affect overlapping targets. Embodiments may also use metadata and annotations associated with change descriptors to infer user intent associated with a sequence of change descriptors and to determine if a conflict exists between the inferred user intents. If no conflict is detected, a set of conditionally appended change descriptors may be committed to their respective change logs. The set of change descriptors to be committed may comprise change descriptors currently being synchronized, change descriptors associated with a target, change descriptors associated with an inferred intent and so on. During synchronization, some sets of changes may be committed without conflict resolution while other changes may require it. Committed change descriptors may be seen as being permanently assigned to a fixed position in the change log of each device participating in the shared data state, so that the respective position of a given change descriptor is the same in the change log of each device. Changes not committed may be overridden in the current locations and added to a later point in the change log. Some embodiments may reposition non-committed changes rather than overriding them.

If a conflict is detected, a variety of mechanisms may be employed to resolve the conflict. FIG. 6 depicts three general categories of conflict resolution mechanisms. One approach is to rollback some or all of the local set of conflicting change descriptors, depicted as operation 606. The rollback operation may comprise removing the conditionally appended change descriptors from a change log, or marking them as null and void.

Another option, depicted by operation 610, is to supersede the local conditionally-appended change descriptors with a received set of change descriptors, thus creating a consensus view based on the received set. For example, upon detecting a conflict, a user might be presented with information describing the conflicting sets of change descriptors and asked to select which set should take precedent. That set may be committed while the conflicting set of conditionally appended change descriptors may be overridden, removed, or repositioned.

Conflicts may also be resolved through a merge process, depicted by operation 608. Automated and/or manual processes may be employed to resolve conflicts between two sets of change descriptors, one a local set conditionally appended to a change log, and another received from a remote device. Embodiments may determine to retain both sets of changes in the consensus view of change descriptors.

For example, local set of change descriptors might be overridden with a new set containing the remote set of change descriptors followed by the local set. The new set might then be made a committed part of the consensus view of the change log.

Embodiments may also merge changes through a process of further reconciliation. A conditionally appended set of change descriptors may be overridden by another set of change descriptors. This set may be committed. The changes described by the overridden set may then be conditionally appended to the end of the change log, and resolved in a subsequent reconciliation process. In FIG. 6, this is depicted by operation 612 and the flow of control branching to a conflict detection operation at 604.

Embodiments might also merge local and remote sets of change descriptors into a single merged set, the conditionally appended change descriptors in each change log may be replaced by the merged set of change descriptors. These changes may then be committed to reflect a consensus view of the change log.

Operation 612 determines whether there are additional pending changes that require further reconciliation. This may occur because when, as a result of operation 608, local conditionally appended change descriptors are to be preserved after a conflicting set of change descriptors has been appended to the local change log as part of the consensus view. It may also occur when a user has continued to make edits during the synchronization process. If no further changes need to be incorporated into the consensus view, synchronization may complete as depicted by operation 614. Otherwise, the process may determine whether the next set of change descriptors conflicts with any other set of conditionally appended changes, at operation 604.

Embodiments may employ contextual information in conjunction with manual and automated merge operations. For example, during conflict resolution a device user might be presented with summaries of operations performed during editing operations. Each summary might be based on change log entries grouped according to inferred intent. Some embodiments might allow for sets of change descriptors to be committed as a set whose members are determined based on inferred intent. In some cases and embodiments, inferred intent may be used to group actions on multiple targets into a single set.

Figure 7:
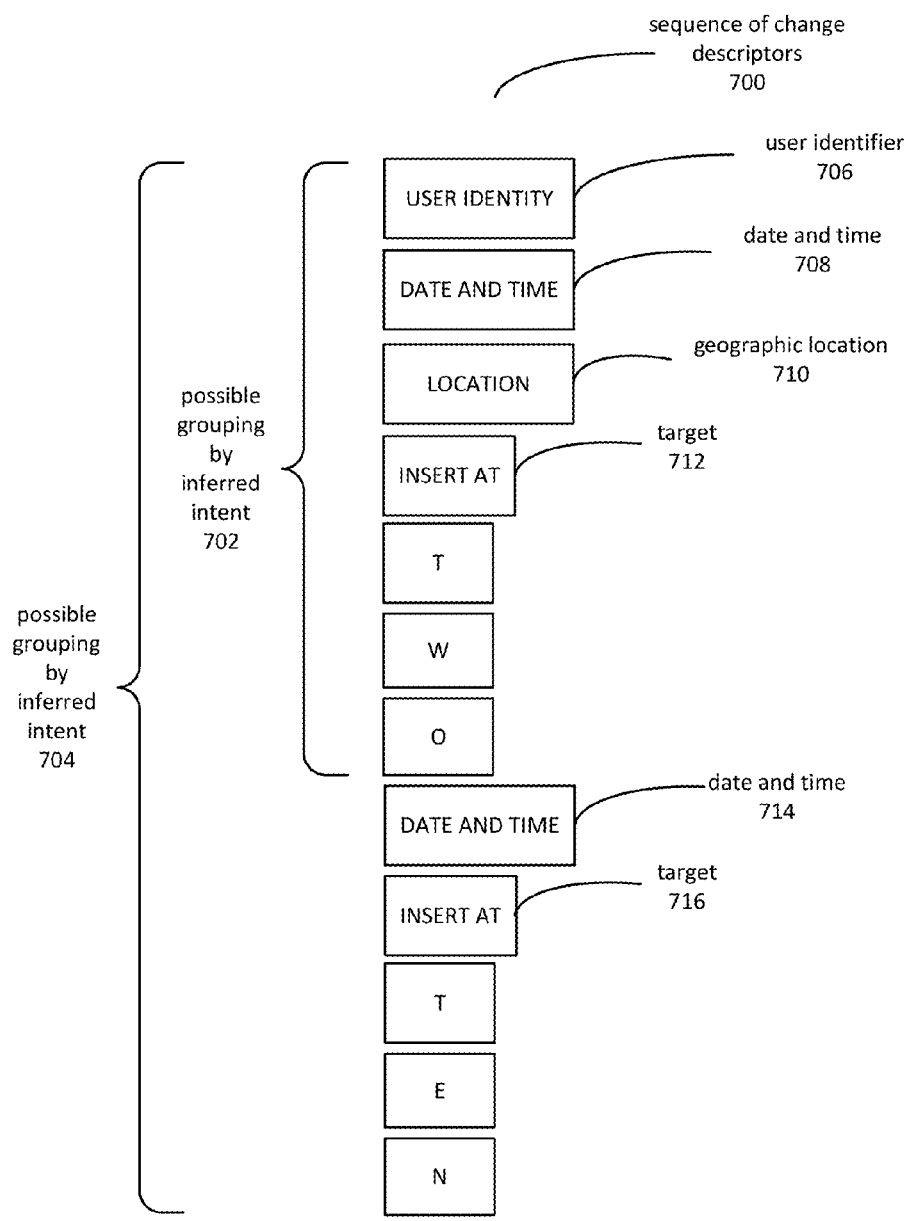
FIG. 7 is a block diagram depicting possible groupings of change descriptors into sets of change descriptors related by inferred intent.

FIG. 7 depicts an example of determining sets of logically related change descriptors based on contextual information embedded, attached or associated to a sequence of change descriptors 700. In the depicted sequence, provided as an illustrative example, there are at least two possible groupings 702 and 704. Interjected into sequence of change descriptors 700 are various entries providing contextual information, such as user identifier 706, date and time 708 and geographic location 710. The contextual information may be presumed to be applicable to subsequent change descriptors until superseded by a subsequent piece of contextual information.

Possible grouping 702 may be inferred based on having comment target 712. Other potential justifications for possible grouping 702 include common user identity 706, common date and time 708, common geographic location 710 or some combination thereof. However, grouping may also be justified where some element of commonality is missing. For example, possible grouping 704 may be justified even though date and time 714 and target 716 are different. For example, date and time 714 might fall within a threshold amount of time of date and time 708, indicating that the user performed a sequence of possibly related actions. Similarly, if target 716 pertains to the same document as target 712, it could be an indication that the changes are related by intent. This could be the case even if the targets overlap because actions performed by the same user within a limited timeframe may be associated with a common intent.

Figure 8:
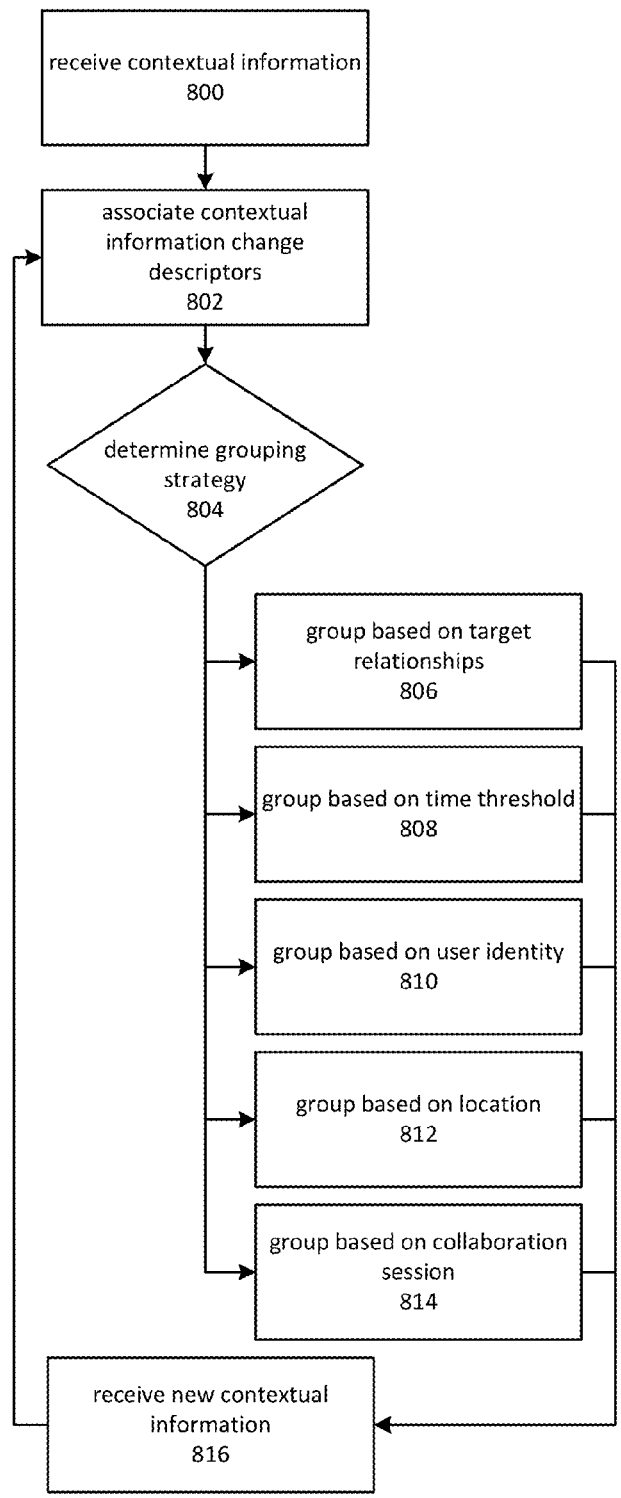
FIG. 8 is a flowchart depicting an embodiment of a process for grouping change descriptors into a set of related change descriptors based on contextual information associated with sequences of change descriptors.

FIG. 8 provides an illustrative embodiment of a process for grouping change descriptors based on contextual information interjected or embedded within a sequence of change descriptors. Although depicted as a sequence of operations, those of ordinary skill in the art will appreciate that the depicted operations are intended to be illustrative and that, in various embodiments, the depicted operations may be altered, omitted, reordered or performed in parallel.

Operation 800 comprises receiving contextual information pertaining to a sequence of change descriptors. A sequence of change descriptors may, for example, be viewed as a list of nodes, some of which may contain contextual information as part of a change descriptor or as a separate node type. A component of a system for synchronizing elements of a shared data state may receive the list and begin processing the change descriptors. Embodiments may structure the list so that change descriptors are preceded by or collocated with contextual information, such as information identifying the user and/or device originating the change. Embodiments that embed contextual information within sequences of change descriptors may benefit from a resulting increased density of information.

Embodiments may employ numerous alternative structures or mechanisms to convey contextual information. For example, a mapping between hither values and relevant contextual information might be employed. Some embodiments may transmit sets of change descriptors in packets associated with a set of metadata. Lists of change descriptors might also be annotated to contain contextual information.

Operation 802 depicts associating subsequent change descriptors. For embodiments employing a list-type structure with embedded contextual information, this may comprise associating change descriptors with whatever contextual information has preceded it. The scope of preceding contextual information may continue until overridden by a conflicting value. Embodiments may also presume that some types of contextual information are cancelled by other types of contextual information. For example, metadata commonly associated with a user or a device might be forgotten if an indicator of a new user or device is encountered while processing a list of change descriptors.

For embodiments not employing a list-type structure, operation 802 may represent performing whatever actions are needed to associated sets of change descriptors with applicable metadata.

Operation 804 depicts determining a grouping strategy based on the type and/or amount of available contextual information. Change descriptors may be grouped for a variety of purposes, such as determining a unit of atomicity for synchronization operations, for displaying information on a device to allow a user to make conflict resolution decisions, for inferring user intent and so forth. Some embodiments may employ a fixed determination, for example by always employing a strategy based on an element targeted by the change descriptors. Other embodiments may adapt the information based on the nature of the targeted element, the nature of the changes, the amount of available metadata information and so forth. Embodiments may also employ a multi-level grouping strategy, so that change descriptors are grouped at a high level and at additional levels. FIG. 8 depicts operations 806, 808, 810, 812 and 814 as non-limiting illustrative examples of strategies that might be employed.

Operation 806 depicts grouping change descriptors according to their targets. Embodiments may group change descriptors having a common target. In some cases and embodiments, change descriptors having a common parent target may be grouped. For example, if a sequence of change descriptors represents the addition of photographs to the same folder, all of the change descriptors might comprise a common group.

Another possibility, depicted by operation 808, is to group change descriptors according to a threshold amount of time. For example, if a number of photographs were added to the same folder, but some photographs were taken the prior week and the remainder taken the current day, two groups might be created to represent the two timeframes.

Operation 810 depicts grouping based on user identity. Changes made by the same user might be associated as a group because they may have a higher probability of being related to each other. Various grouping strategies depicted in FIG. 8 might be combined. For example, a common user might be combined with timeframe-based analysis, based on a higher likelihood of actions taken by the same user but separated in time being less likely to be related.

Operation 812 depicts grouping based on location. On various devices, location may be inferred using various mechanisms such as global positioning systems, wireless transmission, Internet protocol addresses and so forth. Changes performed while a user is in a constant geographic position may be more likely to be related, and thus may be grouped together. Changes performed while the user is in motion might also tend to be related and thus grouped together.

Another possible strategy is depicted by operation 814. In some cases and embodiments, systems and devices participating in a shared data state may be aware of a collaboration session involving users of the system and devices. Contextual information may, for example, be provided indicating the beginning of a collaborative editing process. Additional information might also be provided, such as the identity of devices or users participating in collaborative editing. Change descriptors occurring during collaborative editing could be grouped together. Embodiments might also create additional subgroups using various other strategies described herein.

Grouping may also be determined based on instructions explicitly provided with contextual information. For example, a sequence of change descriptors might be demarcated with contextual information indicating the beginning of a sequence that should be grouped together. The sequence may be terminated by the occurrence of another such indicator, or by various other types of contextual information that can be treated as superseding the grouping instruction.

Group determinations may generally apply to change descriptors having constant or otherwise related contextual information, consistent with the grouping strategy being employed. Operation 816 depicts receiving new contextual information. Upon receipt of the new information, operation 802 may be performed to associate the new information with subsequent change descriptors, and operation 804 may be performed to determine if the new contextual information is indicative of a change in grouping based on the current strategy or the application of a new strategy.

Figure 9:
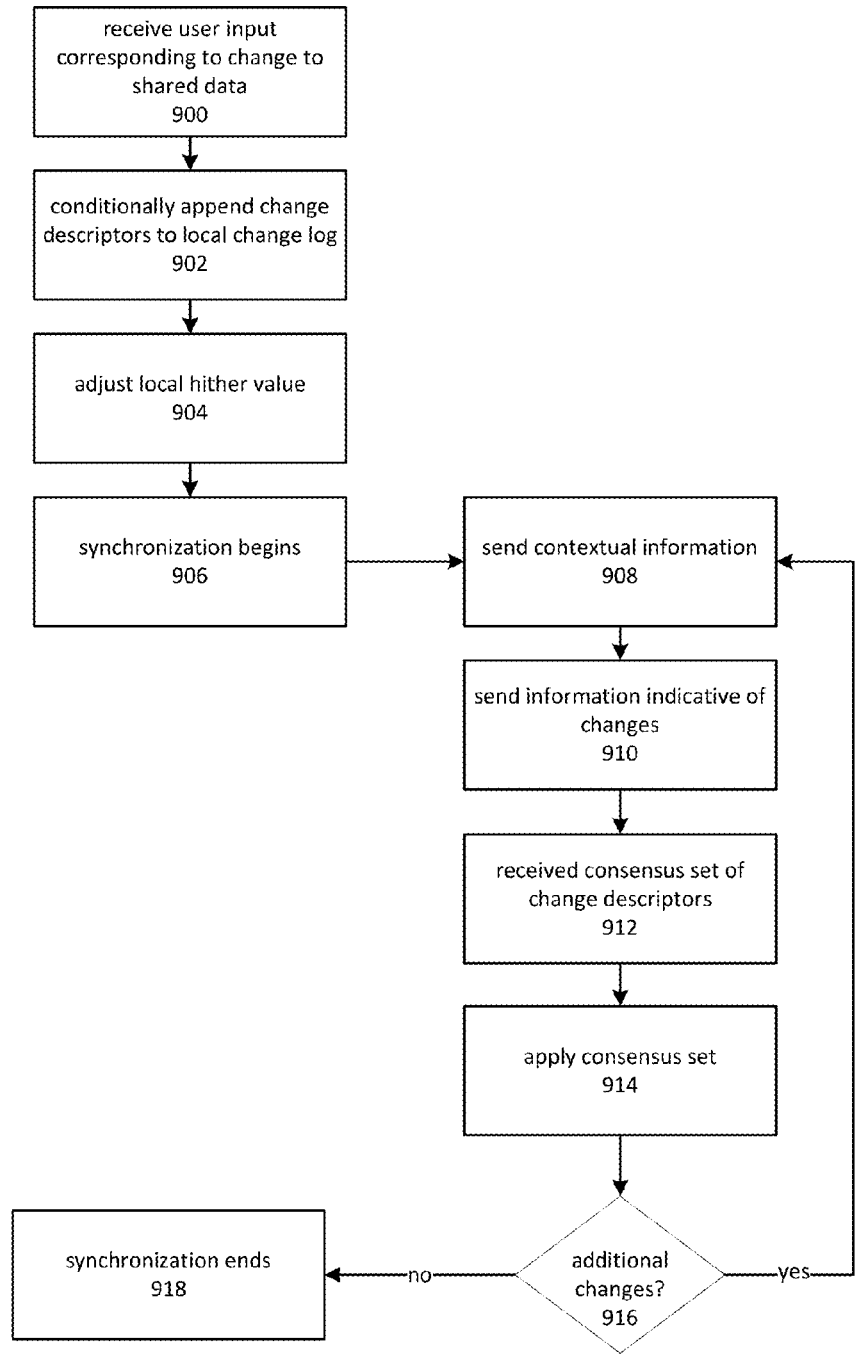
FIG. 9 is a flowchart depicting an embodiment of a process that sends change descriptors for local changes to a shared data state to a remote device for conflict resolution.
Figure 10:
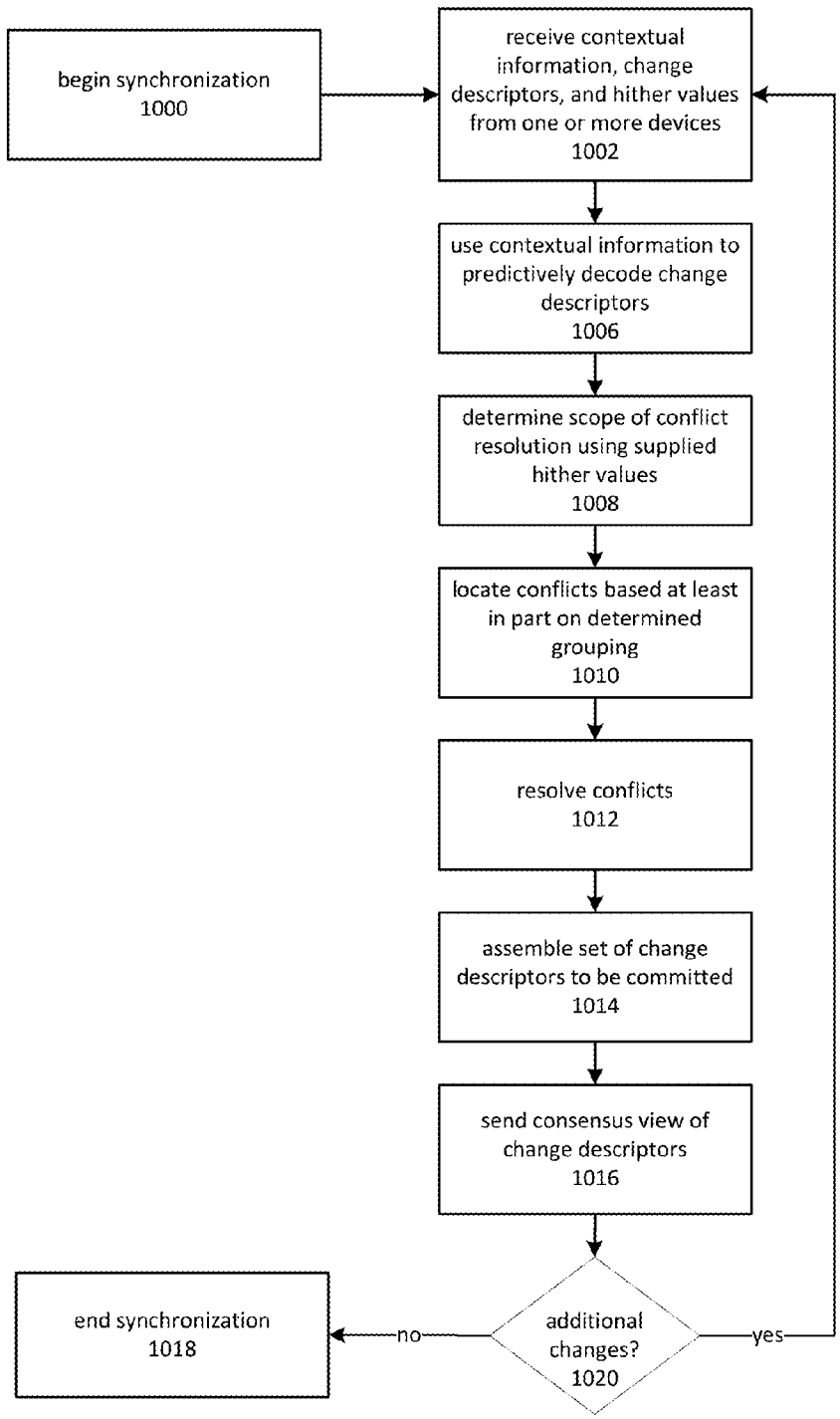
FIG. 10 is a flowchart depicting an example of a process for synchronization performed by a device that coordinates synchronization and conflict resolution with one or more additional devices.
Figure 11:
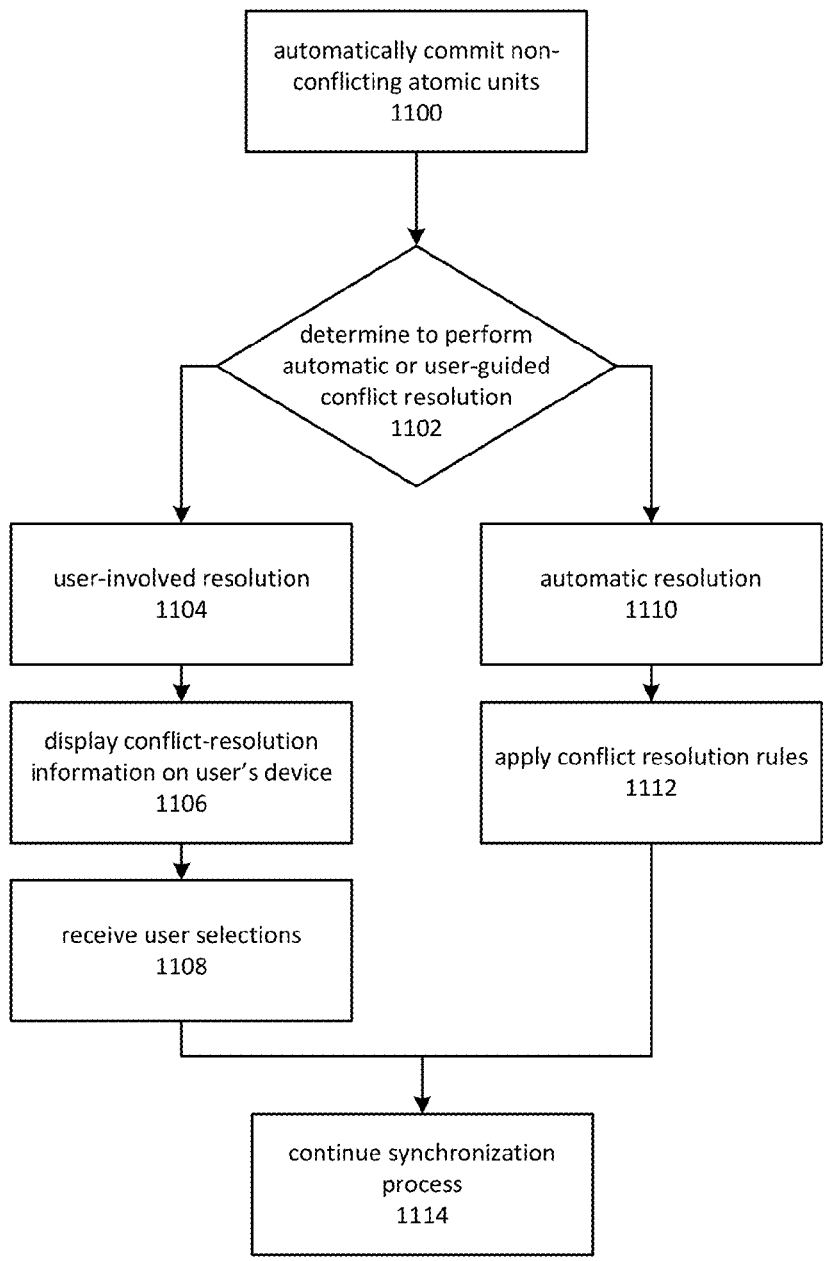
FIG. 11 is a flowchart depicting a process for performing conflict resolution between conflicting sets of change descriptors.

FIGS. 9, 10 and 11 provide illustrative examples of embodiments that incorporate log-based storage of local changes with a synchronization and conflict resolution process that may employ group determinations to determine the atomicity of conditionally appended change descriptors. Elements of these embodiments may comprise at least one device recording locally-made changes in at least one corresponding change log, another device that receives sets of change descriptors for conflict resolution (possibly involving changes made on that device) and a process for resolving conflicts and distributing a view of a shared data state consistent with the resolved conflicts.

FIG. 9 depicts an embodiment of a process that sends change descriptors to a remote device for conflict resolution and receives a resolved set of change descriptors. Although depicted as a sequence of operations, those of ordinary skill in the art will appreciate that the depicted operations are intended to be illustrative and that, in various embodiments, the depicted operations may be altered, omitted, reordered or performed in parallel. FIG. 9 may be presumed, for illustrative purposes, to refer to a device that is participating in a synchronization process but not coordinating it. Accordingly, the participating device may transmit contextual information and change descriptors to a remote device for synchronization and conflict resolution.

Operation 900 depicts receiving information, such as user input, indicative of changes to a shared data state as it is represented on a device. Examples of information indicative of changes to a shared data state include photographs taken, recorded audio, text editing, acceptance of calendar appointments, organizing photographs or files into folders, deleting objects and so on. Operation 902 depicts conditionally appending change descriptors to a change log, where the change descriptors correspond to the information indicative of changes to a shared data state. Embodiments may employ various levels of granularity with respect to the change descriptors. For example, embodiments may record change descriptors at a low level, such as individually recording single character edits. Embodiments might record change descriptors at a high level, such as addition of a binary file. However, low-level changes may be efficient in various embodiments. Operation 904 depicts adjusting a local hither value to reflect conditionally appended change descriptors.

Operation 906 depicts beginning a synchronization process. Embodiments may begin a synchronization process in response to various conditions. Non-limiting examples include in response to a user request, periodically or when a count of unsynchronized change descriptors exceeds a threshold number. Beginning synchronization may comprise receiving information indicative of the start of a synchronization process triggered from another device. For example, the user of a first device might request that synchronization be performed. The first device might then send notifications to one or more additional devices to begin participating in a synchronization process.

The synchronization process depicted by FIG. 9 may comprise sending change descriptors to a device that is coordinating the synchronization process, accompanied by associated contextual information. Embodiments may achieve compact representation by transmitting contextual information prior to any associated change descriptors, as depicted by operation 908. Following the contextual information, the associated change descriptors may be sent, as depicted by operation 910. The value of the consensus hither, as understood by the sending device, may also be sent. The term sending may refer to sending one or more units of data between the devices, directly or indirectly. Contextual information and change descriptors may be sent as a single packet. Various other means of associating contextual information with change descriptors may be employed. Operations 908 and 910 may be repeated to send change descriptors associated with different sets of contextual information.

At operation 912, the local device may receive information corresponding to a reconciled set of change descriptors, which may also be representative of a consensus view of a portion of the change log maintained by each device participating in the shared data set. The reconciled set may comprise the following elements. First, it may include change descriptors originating from devices other than the local device. Second, it may include change descriptors that did originate on the local device. In some embodiments, this element may be omitted because it is duplicative of information already held on the device. However embodiments may include information indicative of the order of these change descriptors in the reconciled set of change descriptors.

At operation 914, the local device's change log may be updated to reflect the reconciled set of change descriptors, which may comprise updating the local device's change log to reflect the new consensus view. Embodiments may replace all conditionally appended change descriptors with the reconciled set. Another approach involves accepting and/or rejecting various conditionally appended change descriptors while also inserting or appending change descriptors originating from other devices, so that the local device's change logs becomes consistent with the reconciled set. In addition, change descriptors in the reconciled set that did not originate from the local device may also be added to the change log. The relative positions of the change descriptors may be adjusted so that the ordering of the local change log matches that of the reconciled set. In addition, values for local copies of the consensus and local hither values may be updated.

The consensus set of change descriptors may exclude changes made on the local device. This may occur, for example, if the changes conflict in some way that could not be resolved by the external device. Upon receiving a set of change descriptors that excludes local changes, the local device may append a set of representative change descriptors to the end of the change log, after the end-point of the new consensus view. Conditionally appended change descriptors may be moved or re-added to the end-point of the consensus view, where their status may remain conditionally appended. Operation 916 may involve determining whether any conditionally appended change descriptors have yet to be resolved. This may occur for the reasons just described, or for various other reasons such as a user of the local device continuing to make changes while synchronization is underway. If any change descriptors remain, the process may resume at operation 908. Once all changes have been sent, the synchronization process may end, as depicted by operation 918.

FIG. 10 is an illustrative example of a synchronization process, as performed by a computing device or process that coordinates synchronization and conflict resolution with one or more additional devices. Although depicted as a sequence of operations, those of ordinary skill in the art will appreciate that the depicted operations are intended to be illustrative and that, in various embodiments, the depicted operations may be altered, omitted, reordered or performed in parallel.

Following the beginning of synchronization at operation 1000, a device or process may receive contextual information and change descriptors from a first device at operation 1002. The first device or process may be the same device or process that is coordinating synchronization and conflict resolution. If so, the contextual information and change descriptors may have been received from a local change log where the change descriptors may have been conditionally appended.

Contextual information and change descriptors may also be received from one or more additional devices or processes. These devices may participate in synchronization and conflict resolution in a manner similar to that depicted by FIG. 9. The information may be received through a variety of means and encoded in a variety of formats. Compression may be used to reduce data sizes for transmission. Contextual information may precede change descriptors in streams of information supplied by each of the one or more devices or processes, and predictive decoding used to map supplied contextual information to subsequent change descriptors, as depicted by operation 1006. Embodiments may achieve efficient compression through the use of this and similar mechanisms that may act to increase information density in transmitted contextual information and change descriptors. Ordinal position in a sequence of change descriptors may be used to identify target objects in place of other forms of identification, such as globally unique identifiers ("GUIDs").

Operation 1008 depicts determining the scope of potential conflicts using supplied hither values. Hither values may be included in information received from various devices at operations 1002. Each device that is participating in synchronization and conflict resolution may supply the value corresponding to its own view of the consensus hither value, which may be used to detect potential conflicts and determine a strategy for resolution. If a reported consensus hither value is out of date with respect to the true consensus hither value, the device or process supplying the out-of-date consensus hither value may be brought up to date by supplying it with change descriptors corresponding to hither values between the reported and true values. During conflict resolution, embodiments may treat change descriptors supplied with an out-of-date consensus hither value as if they had begun at the true consensus hither value.

Operation 1010 depicts determining the grouping and/or atomicity of received change descriptors. Embodiments may identify sets of change descriptors which may be committed or rolled back as atomic units. At operation 1012, the sets of change descriptors may be resolved through conflict resolution, such as a process similar to the one depicted by FIG. 11. Based on results from conflict resolution, each set of change descriptors may be committed or rolled back as an atomic unit.

Change descriptors to be committed may be assembled into a set of change descriptors, as depicted by operation 1014. In some cases and embodiments, change descriptors that are to be committed may need to be reordered. For example, assume that two devices each submit a change request one operation removed from the consensus hither value. In order to commit both change descriptors, the position of one of the two change descriptors may be adjusted so that it corresponds to a position two removed from the consensus hither value.

At operation 1016, a set of change descriptors reflecting the consensus view may be sent to devices participating in the shared data state. Embodiments may send differently sized sets of change descriptors to each device based on each device's reported consensus hither value, minimizing data transmission while enabling each device to update its change logs to reflect the consensus view. Embodiments may transmit change descriptors corresponding to positions from the reported consensus hither to the post-commit consensus hither value. Change descriptors might be replaced in the set with bookmark values if those change descriptors originated on the target device to reduce the size of data to be sent.

At operation 1020, it may be determined that additional change descriptors have yet to be reconciled. This may occur, for example, if change descriptors were previously submitted, found to conflict, and then resubmitted. FIG. 10 depicts a flow of control branching from operation 1020 to operation 1002 to reflect determining that additional change descriptors require reconciliation, and/or receiving additional change descriptors while performing synchronization. The synchronization may end, as depicted by operation 1018, when all conditionally appended change descriptors have been processed and each participating device or process has updated their change log to reflect the consensus view, and updated their copies of the consensus hither value.

FIG. 11 depicts an example of a conflict resolution process that may be employed in conjunction with other aspects of the present disclosure, including operation 1012 as depicted in FIG. 10. Although depicted as a sequence of operations, those of ordinary skill in the art will appreciate that the depicted operations are intended to be illustrative and that, in various embodiments, the depicted operations may be altered, omitted, reordered or performed in parallel.

Embodiments may perform conflict resolution on sets of change descriptors treated as atomic units for the purposes of change resolution. For each set of change descriptors, embodiments may automatically commit those sets of change descriptors that are determined to be non-conflicting, as depicted by operation 1100. For example, two sets of change descriptors that refer to non-overlapping targets may each be committed. This might occur when new files are added, different files are edited and so forth.

Sets of change descriptors that do conflict may be resolved through automatic processes, user-involved processes or some combination thereof. Operation 1102 depicts determining which sets of change descriptors to resolve using automatic resolution and which sets of change descriptors to resolve with a user-involved process. Embodiments may employ a rule-based mechanism to identify and resolve conflicts between certain types of changes. If an applicable rule exists and its application is sufficient to resolve the conflict, an automatic procedure might be employed. Some embodiments may employ automatic procedures in combination with user-involved confirmation. If no applicable rule exists, a user-involved process may be employed for resolving conflicting sets of change descriptors. During conflict resolution, some sets of conflicting change descriptors may be resolved with user-involved processes while other sets are resolved using automatic processes.

Operation 1110 depicts performing automatic resolution of conflicting sets of change descriptors. Automatic resolution may involve application of conflict resolution rules, as depicted by operation 1112. Embodiments may maintain a set of rules that may be mapped to change descriptors, or sets of change descriptors, to resolve conflicts. Inferred intent may also be used as a basis for selecting an applicable rule. Rules may be select based on various factors, such as the type of target or targets affected by the conflicting sets of change descriptors, the type of operations described by the change descriptors and so on.

Application of conflict resolution rules may comprise selecting one set of change descriptors for committing while selecting conflicting sets for being rolled back. A conflict resolution rule may also specify criteria for merging conflicting sets of change descriptors. For example, a rule might specify that certain types of editing operations can be merged to form a new operation. For example, one change descriptor might describe cropping a photo, while another describes removing red-eye from the same photo. A conflict resolution rule might be applicable to allow the photo to be cropped and for red eye to be removed.

Operation 1104 depicts performing user-involved resolution of conflicting sets of change descriptors. User-involved resolution may comprise displaying summarization information on a device, as depicted by operation 1106, and receiving input indicative of sets of change descriptors that should be committed, as depicted by operation 1108. Embodiments may employ groupings of change descriptors to present summaries of the information. For example, a series of change descriptors representative of editing a document may be displayed on a device as a single editing operation, rather than as a series of individual character insertions or deletions.

Application of automatic and/or user-involved conflict resolution may result in a determination involving one or more sets of change descriptors to be committed and may also involve a determination of which sets of change descriptors to be rolled back. Thereafter, the synchronization process may continue, as depicted by operation 1114.

Figure 12:
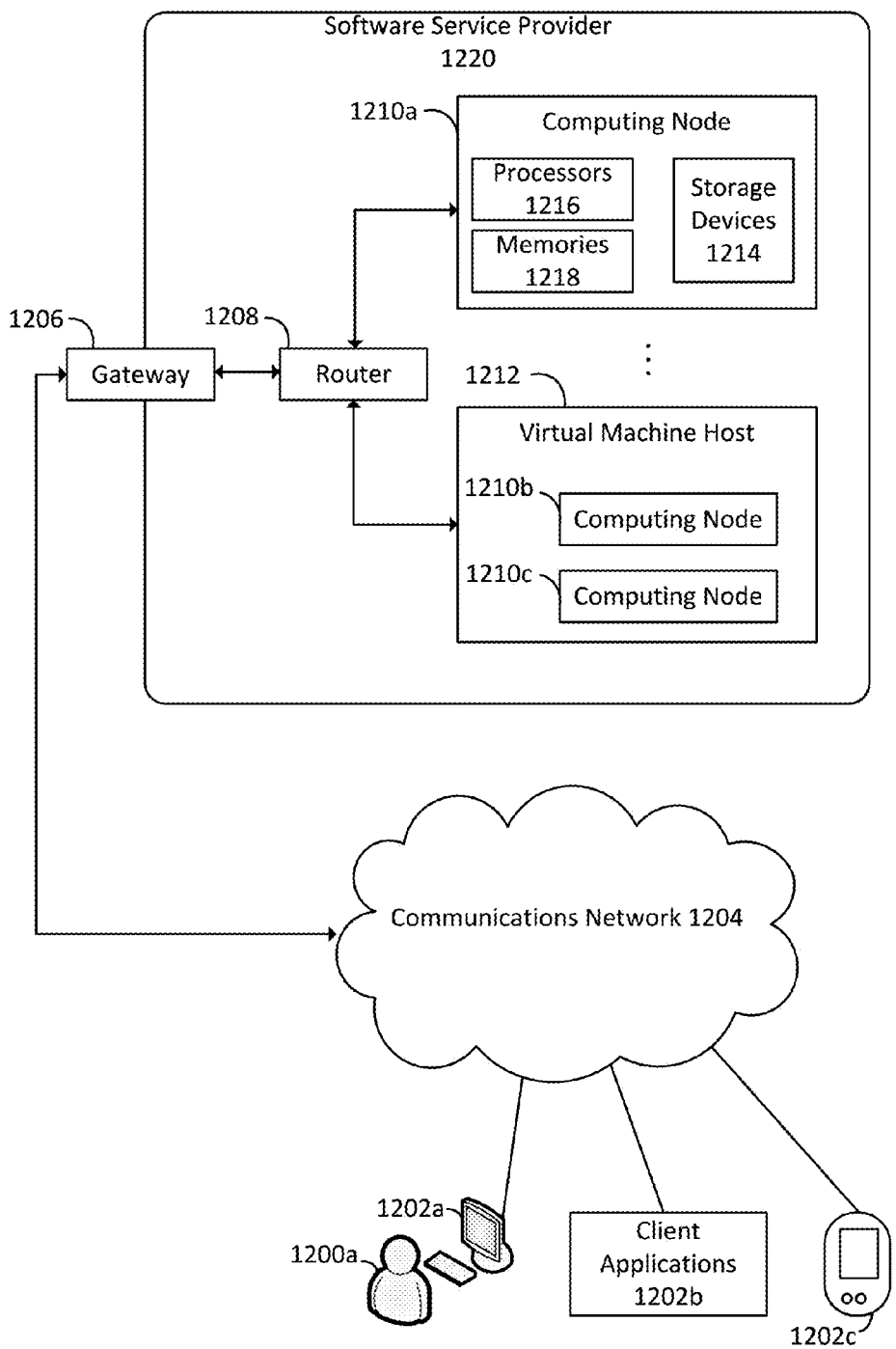
FIG. 12 is a block diagram depicting an embodiment of a computing environment in which aspects of the present disclosure may be practiced.

FIG. 12 is a diagram depicting an example of a distributed computing environment on which aspects of the present invention may be practiced. Various users 1200a may interact with various client applications, operating on any type of computing device 1202a, to communicate over communications network 1204 with processes executing on various computing nodes 1210a, 1210b and 1210c within a location of software service provider 1220. Alternatively, client applications 1202b may communicate without user intervention. Various mobile devices 1202c may operate as a platform for client applications 1202b and may be communicatively coupled to communications network 1204. Communications network 1204 may also be employed to provide device-to-device communication without involving gateway 1206 or software service provider location 1220. Communications network 1204 may comprise any combination of communications technology, including the Internet, wired and wireless local area networks, fiber optic networks, satellite communications and so forth. Any number of networking protocols may be employed.

Communication with processes executing on the computing nodes 1210a, 1210b and 1210c, operating within software service provider location 1220, may be provided via gateway 1206 and router 1208. Numerous other network configurations may also be employed. Although not explicitly depicted in FIG. 12, various authentication mechanisms, web service layers, business objects or other intermediate layers may be provided to mediate communication with the processes executing on computing nodes 1210a, 1210b and 1210c. Some of these intermediate layers may themselves comprise processes executing on one or more of the computing nodes. Computing nodes 1210a, 1210b and 1210c, and processes executing thereon, may also communicate with each other via router 1208. Alternatively, separate communication paths may be employed. In some embodiments, software service provider location 1220 may be configured to communicate with additional data centers, such that the computing nodes and processes executing thereon may communicate with computing nodes and processes operating within other data centers.

Computing node 1210a is depicted as residing on physical hardware comprising one or more processors 1216, one or more memories 1218 and one or more storage devices 1214. Processes on computing node 1210a may execute in conjunction with an operating system or alternatively may execute as a bare-metal process that directly interacts with physical resources, such as processors 1216, memories 1218 or storage devices 1214.

Computing nodes 1210*b* and 1210*c* are depicted as operating on virtual machine host 1212, which may provide shared access to various physical resources such as physical processors, memory and storage devices. Any number of virtualization mechanisms might be employed to host the computing nodes.

The various computing nodes depicted in FIG. 12 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

As used herein, the terms computing node and computing device maybe used interchangeably, and may refer to various hardware or software providers of computing services such as mobile phones, tables, web servers, personal computers, virtual machines and so forth. Computing nodes and computing devices may comprise one or more computers or computer processors and any type of non-transitory computer-readable medium or a storage device.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a first computing device configured to maintain a first collection of ordered change descriptors representative of a causal sequence changes to a first data state, the first computing device configured at least to:
append a first one or more change descriptors to the first collection of ordered change descriptors, the first one or more change descriptors representative of changes to the first data state performed on the first computing device;
receive a second one or more change descriptors, the second one or more change descriptors based at least in part on resolving conflicts between the first one or more change descriptors and additional change descriptors representative of changes to the first data state performed on additional devices;
override a first subset of the first one or more change descriptors from the first collection of ordered change descriptors with the second one or more change descriptors;
append the overridden first subset to an end of the first collection of ordered change descriptors; and
send a value indicative of a highest ordinal position of a committed change descriptor in the first collection after the overridden first subset of the first one or more change descriptors has been overridden by the second one or more change descriptors.

2. The system of claim 1, the first computing device further configured at least to:
determine to override the first subset based at least in part on at least one of the first subset targeting a same element of the first data state as at least one of the second one or more change descriptors.

3. The system of claim 1, the first computing device further configured at least to:
determine the first subset based at least in part on change descriptors in the first subset involving at least one common element of the first data state.

4. A method for synchronizing data, the method comprising:
appending a first one or more change descriptors to a first collection of ordered change descriptors representative of changes to a first data state performed on a computing device;
receiving a second one or more change descriptors, the second one or more change descriptors based at least in part on resolving conflicts between the first one or more change descriptors and additional change descriptors representative of changes to the first data state performed on additional devices;
overriding a first subset of the first one or more change descriptors from the first collection of ordered change descriptors with the second one or more change descriptors;
appending the first subset to the first collection of ordered change descriptors; and
sending a value indicative of a highest ordinal position in the first collection after the first subset of the first one or more change descriptors has been overridden by the second one or more change descriptors.

5. The method of claim 4, further comprising:
determining to override the first subset based at least in part on at least one of the first subset being in conflict with at least one of the second one or more change descriptors.

6. The method of claim 5, wherein being in conflict corresponds to change descriptors having a same target in the first data state.

7. The method of claim 4, further comprising:
determining the first subset based at least in part on change descriptors in the first subset having at least one common target in the first data state.

8. The method of claim 4, further comprising:
determining the first subset based at least in part on contextual information associated with change descriptors of the first subset.

9. The method of claim 4, further comprising:
sending, to the second computing device, a value indicative of a last-ordered position of change descriptors in the first collection after the first subset has been overridden by the second one or more change descriptors.

10. The method of claim 4, further comprising sending the first subset to another computing device for conflict resolution, subsequent to overriding the first subset with the second one or more changes.

11. The method of claim 4, further comprising:
forming an element of the first data state by traversing change descriptors in the first collection.

12. A non-transitory computer-readable storage medium having stored thereon instructions that, upon execution by a first computing device, cause the first computing device at least to:
append a first one or more change descriptors to a first collection of ordered change descriptors representative of changes to a first data state performed on the first computing device;
receive a second one or more change descriptors, the second one or more change descriptors based at least in part on resolving conflicts between the first one or more change descriptors and additional change descriptors representative of changes to the first data state performed on additional devices;
override a first subset of the first one or more change descriptors from the first collection of ordered change descriptors with the second one or more change descriptors;
append the first subset to the first collection of ordered change descriptors; and
send a value indicative of a highest ordinal position in the first collection after the first subset of the first one or more change descriptors has been overridden by the second one or more change descriptors.

13. The computer-readable storage medium of claim 12, comprising further instructions that, upon execution by the first computing device, cause the computing device to at least:
determine to override the first subset based at least in part on at least one of the first subset being in conflict with at least one of the second one or more change descriptors.

14. The computer-readable storage medium of claim 12, comprising further instructions that, upon execution by the first computing device, cause the computing device to at least:
determine to remove the first subset based at least in part on change descriptors in the first subset having at least one common target in the first data state.

15. The computer-readable storage medium of claim 12, comprising further instructions that, upon execution by the first computing device, cause the computing device to at least:
  determine to override the first subset based at least in part on contextual information associated with change descriptors of the first subset.

16. The computer-readable storage medium of claim 12, comprising further instructions that, upon execution by the first computing device, cause the computing device to at least:
  send, to the second computing device, a value indicative of a last-ordered position of change descriptors in the first collection after the first subset has been overridden by the second one or more change descriptors.

17. The computer-readable storage medium of claim 12, comprising further instructions that, upon execution by the first computing device, cause the computing device to at least:
  form an element of the first data state by traversing a sequence of change descriptors in the first collection.

18. The computer-readable storage medium of claim 12, wherein a second subset of the second one or more change descriptors conflicts with the first subset.

19. The computer-readable storage medium of claim 12, wherein the at least one change descriptor of the first subset is associated with contextual information common to the at least one change descriptor of the second one or more change descriptors.

* * * * *